United States Patent [19]

Acheson

[11] 4,155,664
[45] May 22, 1979

[54] END CONNECTOR FOR FLOATING OIL BOOM

[75] Inventor: Roy Acheson, Alameda, Calif.

[73] Assignee: Albany International Corp., Albany, N.Y.

[21] Appl. No.: 905,716

[22] Filed: May 15, 1978

[51] Int. Cl.² ............................................. E02B 3/00
[52] U.S. Cl. .................................... 403/317; 403/331; 403/378; 405/70
[58] Field of Search .............. 403/331, 381, 324, 317, 403/378, 379, 316; 61/1 F; 24/230 BC, 223; 405/70

[56] References Cited

U.S. PATENT DOCUMENTS

| | | | |
|---|---|---|---|
| 3,039,340 | 6/1962 | Livermont | 403/331 X |
| 3,140,522 | 7/1964 | Prout | 24/223 |
| 4,003,206 | 1/1977 | Tanksley | 61/1 F |
| 4,008,575 | 2/1977 | Gallagher | 61/1 F |
| 4,016,726 | 4/1977 | Campbell et al. | 61/1 F |

Primary Examiner—Andrew V. Kundrat
Attorney, Agent, or Firm—Kane, Dalsimer, Kane, Sullivan and Kurucz

[57] ABSTRACT

An end connector for joining with a similar connector to connect two fence sections of a floating oil boom having a central channel and wing so that the wing of one connector is received within the channel of another connector and shoulders to allow for longitudinal movement only, a lock pin movable within a first slot into and out of the channel, a second slot in the wing within the channel to receive the lock pin whereby longitudinal motion of the two connectors is prevented and means for maintaining the lock pin in the second slot in the locked condition including a latch plate with abutting camming surfaces.

4 Claims, 3 Drawing Figures

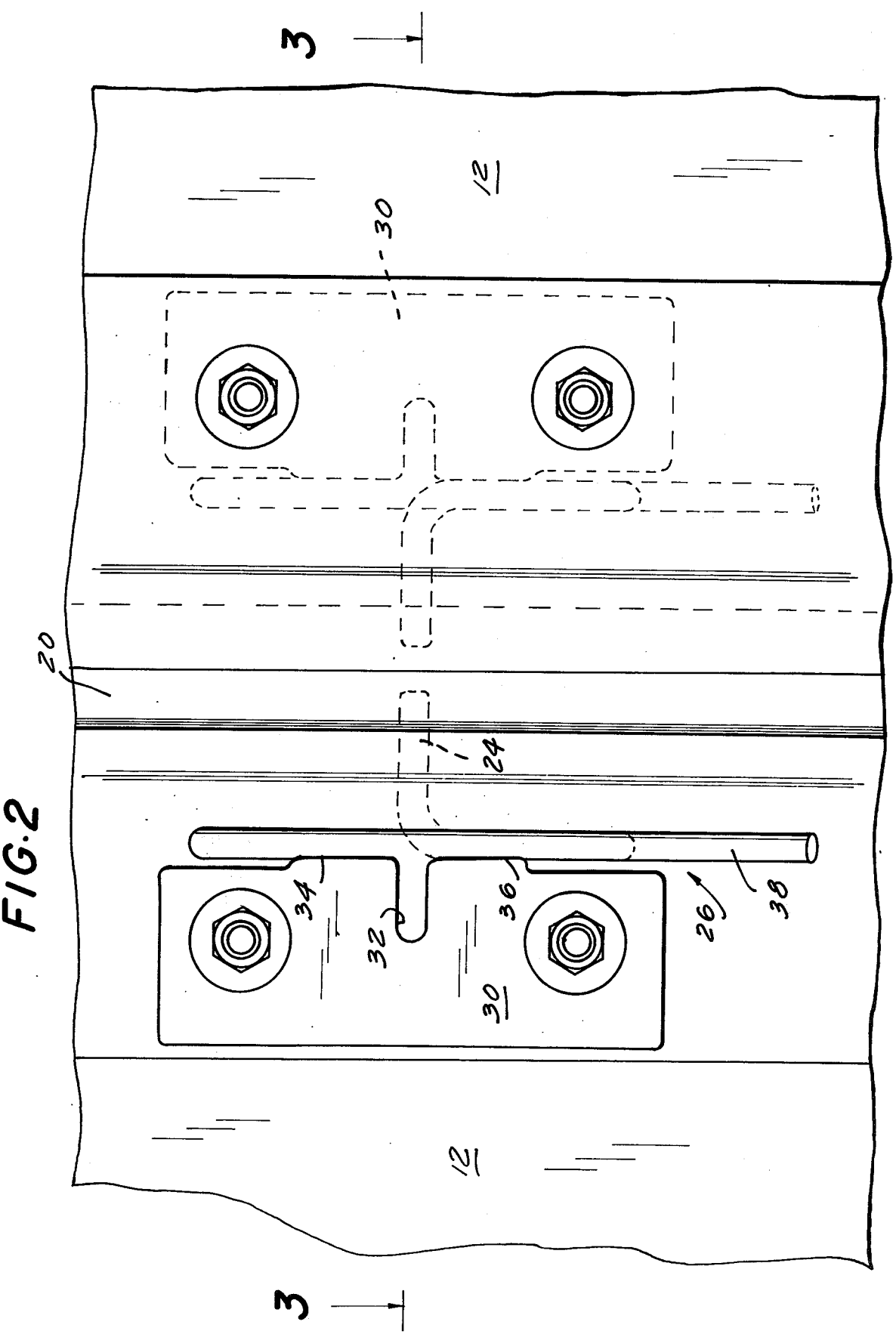

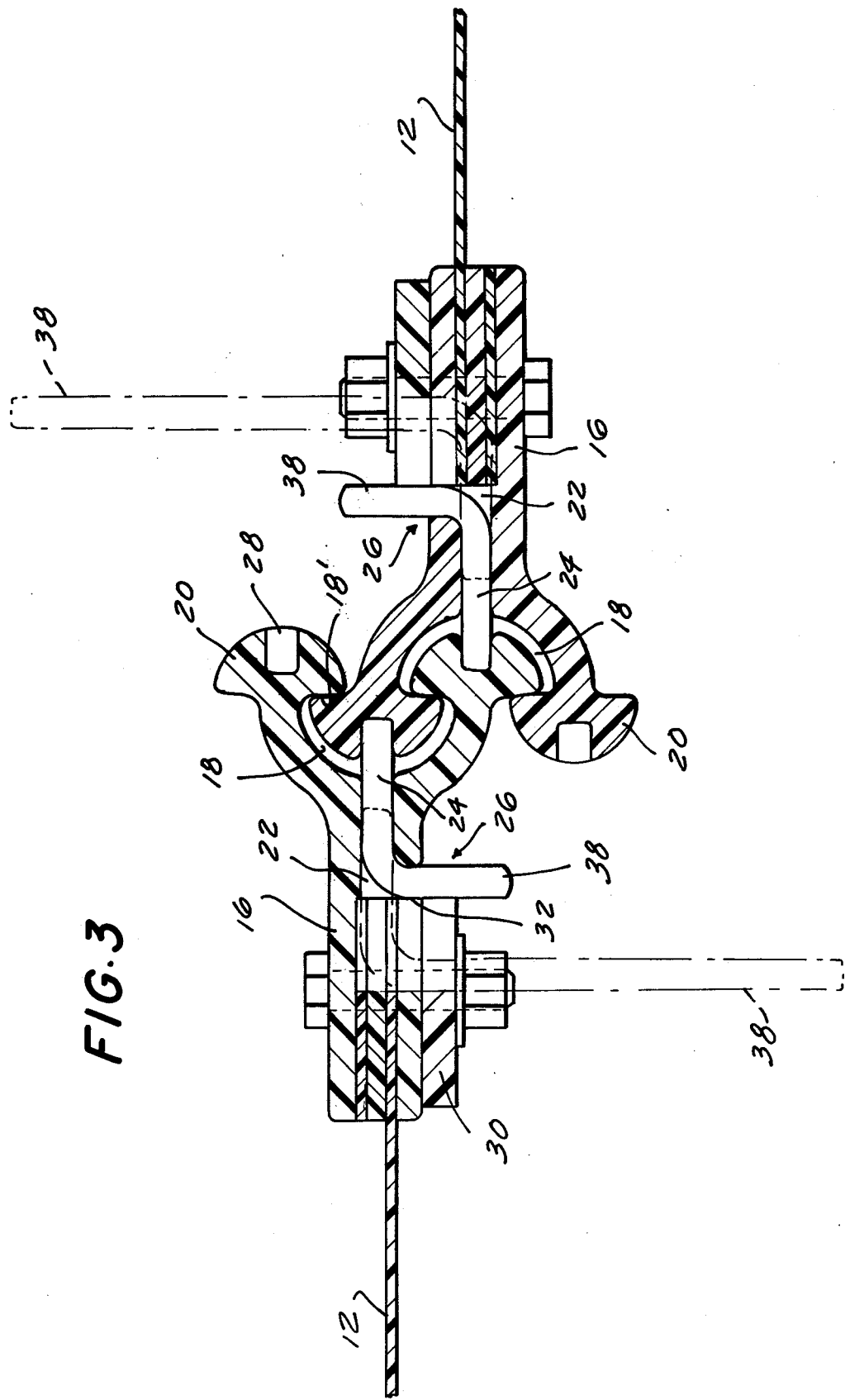

END CONNECTOR FOR FLOATING OIL BOOM

BACKGROUND OF THE INVENTION

Floating booms or fences for use in containment of oil spillage are finding increased use. These booms generally include an elongated sheet like fence or barrier which is vertically disposed in the water and float means for positioning the same. For ease of handling and storage the fence is provided in sections and suitable means for connecting the end of one section to another to form the complete fence is required.

Such end connecting means have heretofor been difficult to use and lacking in reliability

SUMMARY OF THE INVENTION

An end connector for a section of a floating oil fence which has locking means for fail-safe security, said connector utilizing a unique rod means secured in lock position by a high-strength polymer latch plate.

BRIEF DESCRIPTION OF THE DRAWINGS

FIG. 2 is a partially sectional enlarged segmentary front elevation of fence ends joined by a connector of my invention; and FIG. 3 is a sectional view taken along the line 3—3 in the direction of the arrows in FIG. 2.

DESCRIPTION OF THE PREFERRED EMBODIMENT

Figure 1:
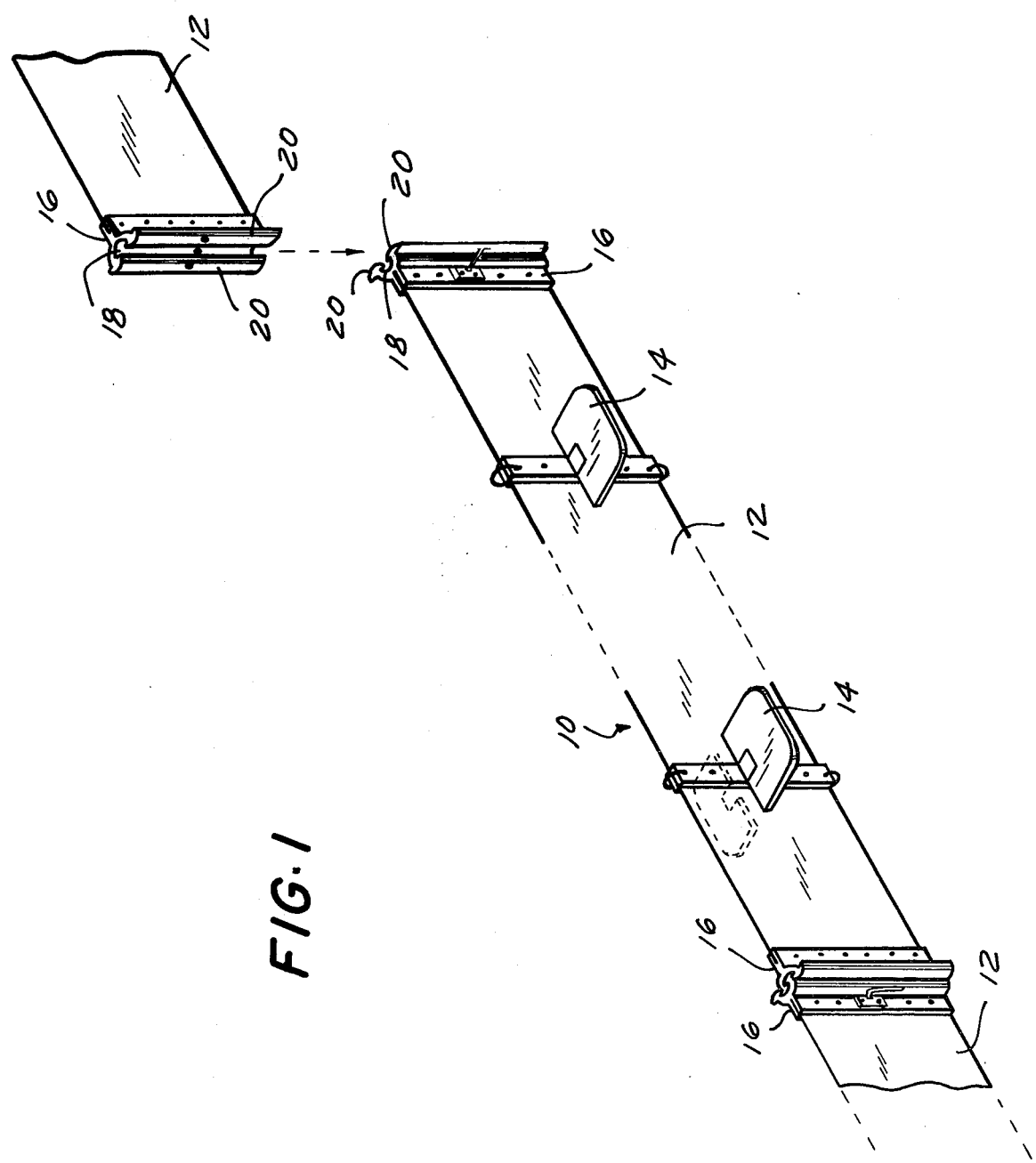
FIG. 1 is a perspective view of a floating boom provided with fence sections employing end connectors constructed in accordance with my invention with one fence section shown in exploded view separated from a second fence section.

In the FIGS. the numeral 10 indicates the vertical partition or barrier portion of the oil boom composed of individual fence sections 12, while the numeral 14 indicates the flotation means on the sides thereof. Each of the fence sections 12 is provided at one end thereof with a connector section 16.

Since the connector sections 16 are identical only one need be described. As seen in the FIGS. in the preferred embodiment the connector extends from the top edge of the fence section to the bottom. The connector has a central channel 18 formed therein with at least one projecting wing or flange section 20.

The body of the connector has a cylindrical slot 22 opening into channel 18 in which the end 24 of a metal "L" shaped lock pin 26 is disposed. The wing section 20 is provided with a slot or hole 28 which in assembly can be aligned with the slot 22 of another connector to receive the end 24 of the lock pin 26 of that connector to provide a firm connection between the sections when the shoulders 20' of the wing are maintained within channel 18 by the shoulders 18 thereof.

In order to maintain the lock-pin in proper locking position, a high-strength polymer latch plate 30 having lock-pin receiving slot 32 formed therin is provided with the slot 32 generally aligned with slot 22 and abutment surfaces 34 and 36 provided on either side therof.

In use two such connector sections 16 are joined by sliding the wing section 20 of one within the channel 18 of the other with the end 38 of the lock pin projecting outwardly from slot 32 of the latch plate with end 24 of the lock pin withdrawn substantially as shown in FIG. 1 and in broken lines in FIG. 3.

After alignment of slots 22 and 28 the lock pin is shifted so that end 24 enters slot 28 as shown in solid lines in FIG. 3. The lock-pin 26 in then rotated against abutment surfaces 34 and 36 within slot 40 formed in the connector so that a portion of end 38 is in slot 40 and that end of the pin substantially adjacent the connector so that the lock pin is securely held in position. It is seen however that it can be readily rotated for separation of connectors.

I claim

1. An end connector for floating oil boom including a generally elongate member having a central channel formed therein and a wing section for receipt within the central channel of a similar member, said channel and said wing section having shoulders to provide a sliding longitudinal fit and prevent separation by pulling in a direction perpendicular to said sliding fit, a first cylindrical slot in said connector communication with said channel and a second cylindrical slot in said wing, said first and second slots being aligned when two such connectors are attached, a lock pin, a first end of said lock pin within said first slot and movable therein for insertion in the second slot of a similar connector for preventing relative longitudinal movement of two connected connectors and means maintaining said lock pin end in said second slot and in which said means for maintaining said lock pin end in said second slot includes a latch plate.

2. An end connector in accordance with claim 1 in which said latch plate has a lock pin receiving slot formed therein generally aligned with said first slot and abutment surfaces on either side thereof to receive said lock pin when it is withdrawn from said second slot.

3. An end connector in accordance with claim 2 in which said connector has a lock slot so that a portion of the end of said lock pin can be therewithin and substantially adjacent said connector whereby said lock pin is securely held in locking position.

4. An end connector in accordance with claim 3 in which said abutments of said latch plate provide camming surfaces upon rotating of said lock pin into locking position.

* * * * *